United States Patent
Yang et al.

(10) Patent No.: US 10,454,147 B2
(45) Date of Patent: Oct. 22, 2019

(54) BATTERY PACK FOR ENERGY STORAGE DEVICES

(71) Applicant: IntraMicron, Inc., Auburn, AL (US)

(72) Inventors: Hongyun Yang, Auburn, AL (US); Troy Barron, Auburn, AL (US); Bruce Tatarchuk, Auburn, AL (US); Paul Dimick, Waverly, AL (US)

(73) Assignee: IntraMicron, Inc., Auburn, AL (US)

( * ) Notice: Subject to any disclaimer, the term of this patent is extended or adjusted under 35 U.S.C. 154(b) by 324 days.

(21) Appl. No.: 15/357,874

(22) Filed: Nov. 21, 2016

(65) Prior Publication Data
US 2017/0149103 A1 May 25, 2017

Related U.S. Application Data

(60) Provisional application No. 62/257,305, filed on Nov. 19, 2015.

(51) Int. Cl.
*H01M 10/613* (2014.01)
*H01M 10/643* (2014.01)
(Continued)

(52) U.S. Cl.
CPC ..... *H01M 10/653* (2015.04); *H01M 10/0525* (2013.01); *H01M 10/613* (2015.04);
(Continued)

(58) Field of Classification Search
None
See application file for complete search history.

(56) References Cited

U.S. PATENT DOCUMENTS

| 3,359,098 A | 12/1967 | Teaford | |
| 3,384,154 A * | 5/1968 | Milton | B01D 1/22 165/111 |

(Continued)

FOREIGN PATENT DOCUMENTS

| CN | 102664292 | 9/2012 |
| CN | 102664292 A * | 9/2012 |

(Continued)

OTHER PUBLICATIONS

Webpage: https://www.asp-inc.com/products/documents/prodinfo/m/magsulfmsd.pdf, magnesium sulfate heptahydrate melting point (Year: 1999).*

(Continued)

*Primary Examiner* — Barbara L Gilliam
*Assistant Examiner* — Zhongqing Wei
(74) *Attorney, Agent, or Firm* — Pabst Patent Group LLP

(57) ABSTRACT

Battery packs for high energy density batteries (cells), particularly arrays of such batteries are described herein. The battery packs include a microfibrous media (MFM)-phase change materials (PCM) composite block and one or more active cooling structures. The MFM is typically sintered to the active cooling structures. The battery packs may contain more than one MFM-PCM composite block. Additionally or alternatively, the MFM-PCM composite block may contain different layers containing different MFM-PCM composites, which have different functionalities. In a preferred embodiment, at least one layer contains a flame retardant PCM, while at least one other layer contains a PCM with a lower melting temperature. The cells may be arranged in a repeating square or equilateral triangle pattern, with one or more active cooling structures in the geometric center of the square or triangle.

20 Claims, 6 Drawing Sheets

(51) Int. Cl.
*H01M 10/653* (2014.01)
*H01M 10/658* (2014.01)
*H01M 10/0525* (2010.01)
*H01M 10/6556* (2014.01)
*H01M 10/6568* (2014.01)

(52) U.S. Cl.
CPC ....... *H01M 10/643* (2015.04); *H01M 10/658* (2015.04); *H01M 10/6556* (2015.04); *H01M 10/6568* (2015.04)

(56) References Cited

U.S. PATENT DOCUMENTS

| | | | |
|---|---|---|---|
| 3,396,782 | A | 8/1968 | Valyi |
| 3,857,680 | A | 12/1974 | Porta |
| 3,984,222 | A | 10/1976 | DeHaan |
| 4,246,057 | A | 1/1981 | Janowski |
| 5,035,837 | A | 7/1991 | Saeki |
| 5,080,963 | A | 1/1992 | Tatarchuk |
| 5,102,745 | A | 4/1992 | Tatarchuk |
| 5,304,330 | A | 4/1994 | Tatarchuk |
| 6,231,792 | B1 | 5/2001 | Overbeek |
| 6,231,793 | B1 | 5/2001 | Strasser |
| 7,501,012 | B2 | 3/2009 | Tatarchuk |
| 8,420,023 | B2 | 4/2013 | Tatarchuk |
| 2003/0056943 | A1 | 3/2003 | Dessiatoun |
| 2004/0046147 | A1 | 3/2004 | Matsuda |
| 2004/0182556 | A1 | 9/2004 | Jahn |
| 2004/0266951 | A1 | 12/2004 | Akiyama |
| 2005/0202310 | A1 | 9/2005 | Yahnker |
| 2009/0004556 | A1 | 1/2009 | Al-Hallaj |
| 2010/0183910 | A1* | 7/2010 | Nishino .............. H01M 2/1055 429/163 |
| 2011/0135543 | A1 | 6/2011 | Tatarchuk |
| 2012/0125447 | A1* | 5/2012 | Fuhr ................... H01M 2/0262 137/260 |
| 2014/0127537 | A1* | 5/2014 | Pflueger ............. H01M 2/1229 429/50 |
| 2015/0192375 | A1 | 7/2015 | Yang |
| 2015/0236386 | A1* | 8/2015 | Yang .................. H01M 10/625 429/120 |

FOREIGN PATENT DOCUMENTS

| | | |
|---|---|---|
| CN | 103178314 | 6/2013 |
| CN | 102783741 | 10/2014 |
| CN | 107760274 A * | 3/2018 |
| DE | 4409026 | 11/1995 |
| DE | 102007059153 | 6/2009 |
| EP | 1602627 | 12/2005 |
| JP | 2005344968 | 12/2005 |
| WO | 2014011225 | 1/2014 |
| WO | 2015123676 | 8/2015 |

OTHER PUBLICATIONS

Agyenim, et al., "A review of materials, hear transfer and phase change problem formulation for latent heat thermal energy storage systems (LHTESS)", Renew Sustain Energy Rev., 14:615-28 (2010).
Catalyst (2015) by Argyle et al.
Han and Fina, "Thermal Conductivity of Carbon Nanotubes and their Polymer Nanocomposites: A Review" Progress in Polymer Science, 36(7):914-44 (2011).
Harish, et al., "Anomalous thermal conduction characteristics of phase change composites with single-walled carbon nanotube inclusions" J. Phys. Chem., 117 (29):15409-13 (2013).
International Search Report and Written Opinion for PCT Application PCT/US2013/030837 dated Dec. 2, 2013.
International Search Report and Written Opinion for PCT Application PCT/US2013/030890 dated Jan. 16, 2014.
International Search Report for PCT Application PCT/US2015/016175 dated May 4, 2015.
Jegadheeswaran and Pohekar, "Performance enhancement in latent heat thermal storyage system: A review", Renew Sustain Energy Rev., 13:225-44 (2009).
Khateeb, et al., Design and simulation of a lithium,-ion battery with a phase change material thermal management system or an electric scooter\, J Power Sources, 128:292-307 (2004).
Kizilel, et al., "Passive control of temperature excursion and uniformity in high-energy li-ion battery packs at high current and ambient temperature", J Power Sources, 183:370-5 (2008).
Mills, et al., "Thermal conductivity enhancement of phase change materials using a graphite matrix", App Thermal Eng., 26:1652-61 (2006).
Office Action for U.S. Appl. No. 14/413,995 dated Nov. 2, 2016.
Rao and Wang, "A review of power battery thermal energy management", Renew Sustain Energy Rev., 15:4554-71 (2011).
Rao and Zhang, "Thermal properties of paraffin wax-based composites containing graphite", Energy Sources, Part A, 33:587-93 (2010).
Salunkhe, et al.., "A review on effect of phase change material encapsulation on the thermal performance of a system", Renew Sustain Energy Rev., 16:5603-16 (2012).
Sheng, et al., "High conductivity catalyst structures for application in exothermic reactions", Appl Catalyst A Gen., 445-446:143-52 (2012).

* cited by examiner

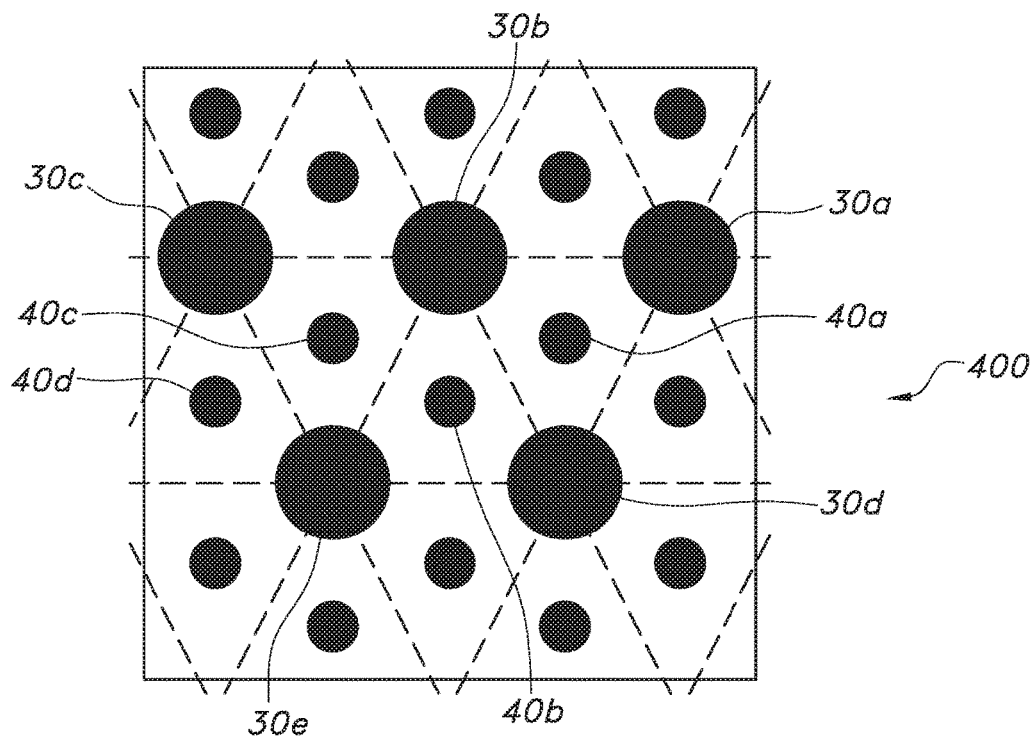
FIG. 3B
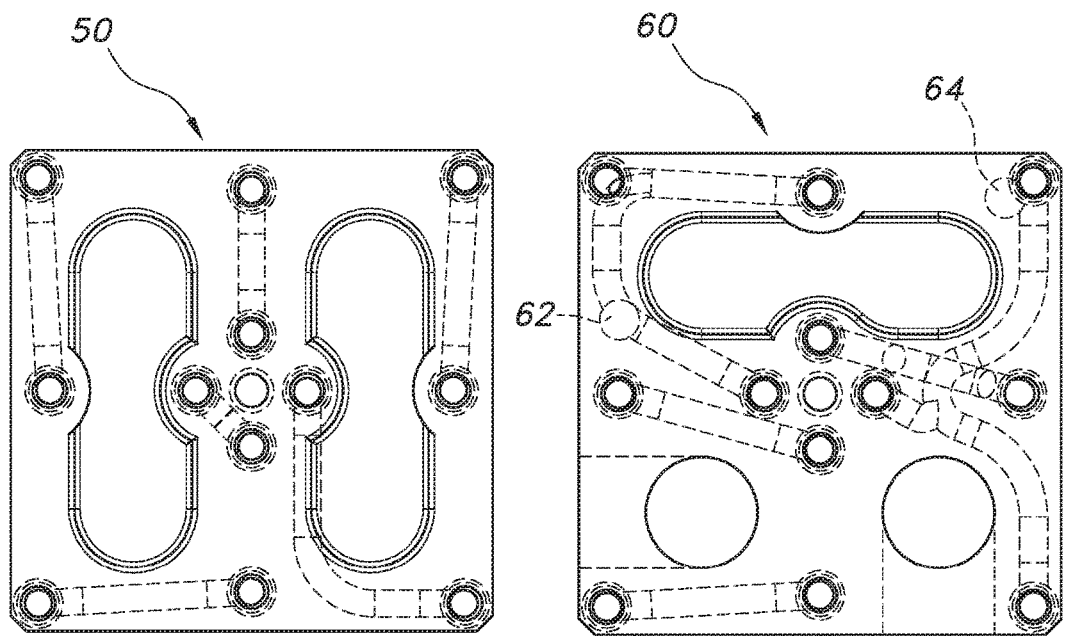
FIG. 4A
FIG. 4B

BATTERY PACK FOR ENERGY STORAGE DEVICES

CROSS-REFERENCE TO RELATED APPLICATION

This application claims priority to U.S. Provisional Application No. 62/257,305, filed Nov. 19, 2015, the disclosure of which is incorporated herein by reference in its entirety.

FIELD OF THE INVENTION

The invention is generally directed to thermal management systems for energy storage cells having high charge/discharge currents, such as batteries and other electronic devices.

BACKGROUND OF THE INVENTION

Lithium ion (Li-ion) cells have been widely used for power and energy applications. Heat generation within Li-ion cells causes problems for performance, longevity, and safety, especially for those power cells required to be continuously discharged at extremely high currents. It may not be a significant issue for individual cells operated in ambient air even when they are discharged at their highest allowable currents. However, the issue can be severe when the cells are discharged in an assembled battery pack. In a battery pack, a cell is surrounded by neighboring cells, which are also generating heat. In the space-limited pack, cell cooling becomes difficult. If effective cooling is not available, the cells have to be derated to a much lower operation current to ensure safe operations. For example, cells that are rated for 500 A in ambient conditions can only be discharged at 200 A in a battery pack of twelve cells due to the heat generation inside the pack. The derating of discharge current will result in more paralleled battery pack series to reach the targeted currents. Moreover, the poor heat transfer within the battery pack will also increase cool-down time and reduce the cycle frequency.

WO 2015/123676 by IntraMicron describes a battery pack made of microfibrous media (MFM) filled with phase change materials (PCM), i.e. MFM-PCM. The MFM is a sintered 3D network made of micron-sized metal fibers. It typically has a high void volume of 70-99.5 vol %. For heat transfer purposes, the fibers are made of thermally conductive metals such as copper, nickel, aluminum, and their alloys and have a fiber diameter less than 100 microns. PCM are commonly paraffin waxes, glycols, fatty acids, inorganic hydrated salts, eutectic alloys, etc. IntraMicron's approach demonstrated superior thermal management performance compared with the traditional cooling tube approach.

It is an object of the invention to provide battery packs that are able to efficiently dissipate heat from multiple cells in the pack.

SUMMARY OF THE INVENTION

Battery packs for high energy density batteries (cells), particularly arrays of such batteries are described herein. The battery packs include a microfibrous media (MFM)-phase change materials (PCM) composite block, and one or more active cooling structures. End plates are also included on the upper and lower surfaces of the battery packs. Generally, the MFM-PCM in the battery pack contain multiple blocks or sections with different functionalities. For example, one or more of the PCM in an MFM-PCM block may serve as a flame retardant to prevent the battery pack from catching on fire or prevent a first from spreading within the batter pack if one occurs.

The battery packs may contain more than one MFM-PCM composite block. The MFM-PCM block, may contain a first MFM-PCM composite, with a PCM having a first melting point that is less than the operating temperature of the cells in the battery pack, and a second MFM-PCM composite having a second PCM with a higher melting point, where the second PCM is preferably a flame retardant material. Both the first and the second PCMs are inert with respect to the fibers in the PCM and any plastics on the cell surface.

Additionally or alternatively, an MFM-PCM composite block may contain different layers containing different MFM-PCM composites, which have different functionalities. In a preferred embodiment, at least one layer contains a flame retardant PCM, while at least one other layer contains a PCM with a lower melting temperature.

Optionally, the MFM and the active cooling structure(s) are thermally integrated by sintering them together. This sintering step generally occurs prior to the infusion of PCM into MFM. Due to the sintering, the heat transfer at the interface of MFM and active cooling structure can be significantly improved.

In some embodiments, the cells and cooling tubes the active cooling structures are aligned in a particular orientation inside the MFM-PCM block. The cells and the active cooling structures are generally aligned parallel to each other. Additionally, the cells and the active cooling structures are generally perpendicular to the planar direction of MFM. Optionally, the cells can be arranged in a repeating square or equilateral triangle pattern, with active cooling structures in the geometric center of the square or triangle.

BRIEF DESCRIPTION OF THE DRAWINGS

In FIG. 1A, the interior layers contain a mixture of a PCM that is a wax and the MFM, while the outer layers contains a flame retardant PCM along with the MFM. In FIG. 1B, these different layers, e.g. flame retardant PCM with MFM and wax PCM with MFM, alternate throughout the battery pack in a manner that surrounds each of the individual cells. FIG. 1C illustrates a battery pack that has the same configuration as depicted in FIG. 1A, with the addition of a flame retardant material surrounding the layers of MFM-PCM.

FIGS. 3A and 3B are cross-sectional partial views of exemplary battery packs, depicting the relative locations of the cooling tubes and cells in the battery packs. As shown in FIG. 3A, the cells may be aligned in a square pattern, as shown in the cross-sectional view. As shown in FIG. 3B, the cells may be aligned in an equilateral triangle, as shown in the cross-sectional view. In both embodiments, the cooling tubes are located at the geometric center of the squares or the triangles, respectively.

FIGS. 4A and 4B are illustrations of exemplary bottom (FIG. 4A) and top (FIG. 4B) end plates.

DETAILED DESCRIPTION OF THE INVENTION

I. Battery Packs

Figure 1A:
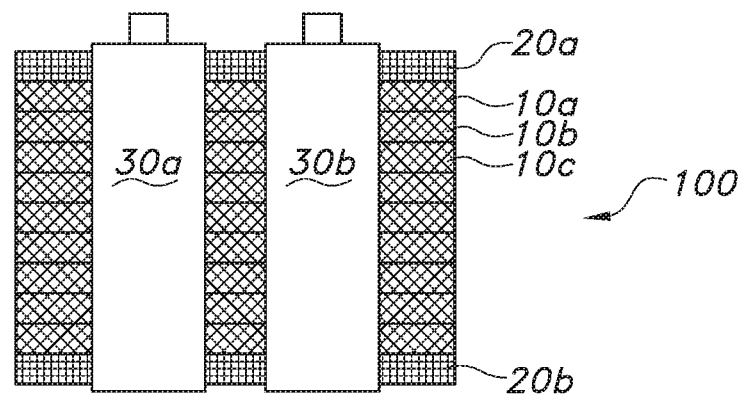
FIGS. 1A, 1B, and 1C are cross-sectional views of schematics of exemplary arrangements of different layers containing different combinations of microfibrous materials (MFM) and phase change materials (PCM) in a battery pack.

Battery packs that contain a combination of active and passive cooling elements are described herein. The battery packs contain one or more thermally conductive microfibrous media (MFM) comprising one or more phase change materials (PCM) dispersed within the microfibrous media (e.g. passive cooling) and one or more active cooling structures (e.g. cooling water tubes or channels and/or cold plates). In some embodiments, the battery packs contain a more than one MFM-PCM composite, and the PCM in a first MFM-PCM composite is different than the PCM in a second MFM-PCM composite.

The MFM may be sintered to the one or more active cooling structure(s). This sintering step generally occurs prior to the infusion of PCM into MFM.

In some embodiments, the cells and the active cooling structures are aligned in the same direction inside the MFM-PCM block. The cells and the active cooling structures are generally aligned parallel to each other.

The fibers in the MFM have been observed to generally align in the planar direction of the MFM. Additionally, the cells and the active cooling structures are generally perpendicular to the planar direction of MFM.

A. Block of Microfibrous Media (MFM) and Phase Change Materials (PCMs) Composite The phase change material(s) can be incorporated into the MFM by melting the PCM and soaking the MFM in the liquid PCM. After the PCM cools and solidifies, the PCM in MFM (MFM-PCM composite) is formed. MFM-PCM composite can be prepared in different shapes, patterns and structures for insertion in energy storage devices (e.g. batteries and supercapacitors).

The volume fraction of microfibrous material inside the MFM-PCM block is typically in the range of 3-30%, optionally the volume fraction of microfibrous material inside the MFM-PCM block is 3-5%, 5-10%, 10-20%, or 20-30%, in order to achieve the thermal conductivity target.

In some embodiments, the concentration of the PCM in the PCM-MFM composite is from about 65 to about 95 vol. %, optionally from about 65 to about 70 vol. %, from about 70 to about 80 vol. %, or from about 80 to about 95 vol. %, preferably from about 70 to about 80 vol. %.

The MFM-PCM composite block preferably has a minimum thermal conductivity of at least 5 W/m-K, preferably at least 10 W/m-K, optionally between 10 and 60 W/m-K, however higher thermal conductivities are also useful. The volume fraction of fibers inside the MFM-PCM block is typically in the range of 3-30% in order to achieve the desired thermal conductivity.

The contact of the MFM-PCM composite on the cell surface and the active cooling structures also influences for heat transfer. As estimated by COMSOL Multiphysics® modeling software, when the MFM is sintered to the active cooling structures, the minimum overall heat transfer coefficient is 600 W/m$^2$-K, preferably greater than 900 W/m$^2$-K, optionally in the range of 900 W/m$^2$-K to 1,800 W/m$^2$-K. In contrast, when the MFM is not sintered to the active cooling structures, lower overall heat transfer coefficients were calculated, e.g. around 360 W/m$^2$-K.

By way of example, preferably the minimum surface area of the MFM-PCM composite block is 36 cm$^2$/g of copper based on the largest copper fiber diameter of 250 microns. The skilled person can determine suitable surface areas of the MFM-PCM composite block based on different microfibrous media and/or different fiber diameters.

1. Microfibrous Media (MFM)

Microfibrous media are highly-porous, sintered, nonwoven support structures capable of entrapping a variety of materials in a fixed-fluidized bed configuration. Microfibrous media can be made of polymer, ceramic, glass, metal, and/or alloy fibers (e.g., microfibers). The material selected for the microfibrous matrix depends on the desired application. Polymeric fibers are typically used for low cost applications, while ceramic/glass fibers are preferred for highly corrosive environments. Metal and alloy microfibers are preferred for cases where enhanced heat and/or electrical conductivity are desired. In some embodiments, the fibers are metallic fibers, such as copper, nickel, aluminum, steel, stainless steel, silver, or gold, or alloys thereof, or combinations thereof.

The fibers can be a mixture of fibers having different diameters, lengths, and/or composition. The fibers can have any suitable diameters, although the diameter is typically less than 1000 microns. In some embodiments, the diameter is from 0.5-200 μm, preferably 4-100 μm. The length of the fibers is typically from about 0.1 to 10 mm, optionally 1 to 10 mm, 3 to 8 mm, or 4 to 8 mm, and preferably 5 to 6 mm. In some embodiments, the length of the fibers is about 1 mm.

In microfibrous media structures the volumetric loading of the metal fibers and materials entrapped therein are mostly independent of one another. This allows the relative amounts of each component to be adjusted over a wide range of parameters. In some embodiments, the concentration of the fibers in the MFM-PCM is from about 1 to about 40 vol. %, preferably from about 10 to about 30 vol. %.

The media can be prepared using techniques known in the art, such as wet-lay and sintering processes as disclosed in U.S. Pat. Nos. 5,080,963, 5,080,963, 5,304,330, 6,231,792, 7,501,012, and 8,420,023, which are incorporated herein by reference in their entirety.

The as-prepared media can contain 0.5-15 vol. % of fibers, typically 0.5-10 vol. %. The opening pore sizes of the media are in the range of 10-120 mesh, typically 50-100 mesh, and preferred 60-90 mesh, depending on the fiber diameter and fiber length and preparation conditions. The void space is at least about 60%, preferably from about 85 to about 99.5%. Fiber length can vary but is typically about 0.1 to about 10 mm. The as-prepared media can be processed to reach the aforementioned preferred fiber volumetric fractions.

The media can contain multiple layers containing fibers of different diameters and/or different materials depending on materials to be entrapped and/or intended application. The fibers in the multiple layers can be fused together during the sintering step.

In some embodiments, the MFM further contains carbon fibers, graphite fibers, and/or carbon nanotubes, such as single-walled and/or multiwalled nanotubes. The carbon/graphite fibers can be in the form of wet-lay sheets, bonded threads or yarns, and/or woven sheets. The diameter of the fibers can vary. However, in some embodiments, the diameter of the fibers is from about 1 nm to about 250 microns, preferably 1 micron or greater, such as from about 1 micron to about 250 microns or from about 1 micron to about 100 microns.

MFM is a good interfacial material for improving heat transfer from batteries, particularly cylindrical batteries. MFM are flexible and deformable so that MFM can be deformed to match various surfaces, i.e. the surfaces of batteries and the cooling structures. MFM made of microsize metal fibers can form multiple contacting points on the surfaces.

2. Phase Change Materials (PCMs)

Phase change materials (PCMs) utilize the latent heat capacity of phase changes (i.e. solid-liquid or solid-solid phase changes) to capture and store heat. These structures store heat during fast battery charge and discharge and reduce the peak temperatures and release heat back to the environment slowly during off-peak operation (e.g. charge). The PCM inside MFM regulates the cell surface temperature around the PCM melting point by storing the excessive heat generated during peak use and releasing it back to the embedded cooling channels.

Typically, the one or more phase change materials are chemically inert with respect to the fibers in the MFM and any plastics on the cell surfaces.

In some embodiments, the one or more phase change materials are electrically insulating. In some embodiments, the one or more phase change materials have heats of fusion larger than 75, 80, 85, 90, 95, 100, 105, 110, 115, 120, 125, 130, 135, 140, 150, 160, 170, 180, 190, 200, 210, 220, 230, 240 or 250 J/g. In some embodiments, the one or more phase change materials have heats of fusion ranging from 100 J/g to 250 J/g.

In some embodiments, the one or more phase change materials have a melting temperature range of less than 5° C., more preferably less than 2° C. In some embodiment, the one or more phase change materials have a solidifying temperature range of less than 5° C., more preferably less than 2° C. In some embodiments, the one or more phase change materials have a melting temperature range and a solidifying temperature range that overlap with a maximum difference of 2° C., more preferably 0° C. In some embodiments, the PCM solidify at a temperature higher than the temperature of the cooling water circulating through active cooling structures. In some embodiments, the PCM solidify at a temperature below the threshold temperatures of the energy storage cell.

In order to keep the cells safe, the PCM typically has a melting point less than the maximum allowed cell working temperature. For example, when the cells have a threshold working temperature of 60° C., a PCM with a melting point ranging from about 40° C. to about 60° C. is suitable, preferably the melting point is in the range of about 52° C.-59° C., optionally the melting point is about 55° C. In order to keep the fast heat transfer between the MFM-PCM and the cooling tubes, a higher melting point PCM is preferred. Thus, the melting point of the PCM is typically 2-5° C. lower than the threshold working temperature of the cells, e.g. Li-ion cells.

In some embodiments, the one or more phase change materials are selected from waxes, polyethylene glycols, fatty acids, metals salts with crystal water, low melting eutectics including metal alloys and mixed chemicals, and combinations thereof. Preferred PCM materials are paraffin waxes, hydrated metal salts, eutecitcs and the materials described in Table 1.

The flame retardant PCMs are generally inert with respect to the fibers in the MFM, e.g. metals, such as copper. Additionally the flame retardant PCMs do not burn at the temperatures to which the battery pack is generally exposed. Further, typically, the flame retardant PCMs have a lower latent heat capacity and a higher melting point than the wax PCMs. However the latent heat capacity of the flame retardant PCM is selected so that it is not too low and therefore does not impact the overall heat transfer properties of the battery pack.

TABLE 1

Exemplary PCMs and their physical properties

| Compound | Melting point (° C.) | Latent heat of fusion (kJ/kg) | Thermal conductivity (W/mK) |
| --- | --- | --- | --- |
| RT25-RT30 | 26.6 | 232.0 | 0.18 (liquid), 0.19 (solid) |
| n-Octadecane | 27.7 | 243.5 | 0.148 (liquid), 0.19 (solid) |
| $CaCl_2 \cdot 6H_2O$ | 29.9 | 187 | 0.53 (liquid), 1.09 (solid) |
| $Na_2SO_4 \cdot 10H_2O$ | 32, 39 | 180 | 0.15 (liquid), 0.3 (solid) |
| Paraffin wax | 32-32.1 | 251 | 0.514 (solid), 0.224 (liquid) |
| Capric acid | 32 | 152.7 | 0.153 (liquid) |
| Lauric-palmitic | 35.2 | 166.3 | — |
| Lauric acid | 41-43 | 211.6 | 1.6 |
| Stearic acid | 41-43 | 211.6 | 1.60 (solid) |
| Medicinal paraffin | 40-44 | 146 | 2.1 (liquid), 0.5 (solid) |
| Paraffin wax | 40-53 | — | — |
| P116-Wax | 46.7-50 | 209 | 0.277 (liquid), 0.140 (solid) |
| Indrawax 5860-FE | 57-59 | — | — |
| Indrawax 6062-FE | 60-62 | — | — |

In particularly preferred embodiments, the PCM have a melting temperature range and a solidifying temperature range that overlap with a maximum difference of 2° C., preferably with no difference in these ranges. Preferably the PCM is a material that does not cause cross contamination when used in a thermal management system, such as a battery pack, particularly when placed in contact with packs or arrays of batteries. Additionally, the PCM preferably uniformly conforms to the structure of the MFM. In some embodiments, at least one of the PCMs is a wax.

Some of the metal salts, such as magnesium sulfate heptahydrate, have other functions such as flame retarding in addition to the heat storage function.

3. Additives to Increase the Thermal Conductivity of the PCM

The addition of small amounts of carbon nano-materials can significantly improve the thermal conductivity of the PCM. See, e.g. Mills, et al., "Thermal conductivity enhancement of phase change materials using a graphite matrix", *Applied Thermal Engineering*, 26(14):1652-1661 (2006); Harish, et al., "Anomalous thermal conduction characteristics of phase change composites with single-walled carbon nanotube inclusions", *J. Phys. Chem.*, 117(29):15409-15413 (2013); and Han and Fina, "Thermal Conductivity of Carbon Nanotubes and their Polymer Nanocomposites: A Review". In: *Progress in Polymer Science,* 36(7):914-944 (2011). For example, paraffin wax's thermal conductivity can be increased a hundredfold by infusing the paraffin into porous graphite matrices. See, Mills. Inserting carbon fibers into the PCM can also increase the thermal conductivity. According to Harish, et al., thermal conductivity of hydrocarbons can be increased by 250% just by adding single-walled carbon nanotubes at 0.25 wt %. Han and Fina maintain that carbon-based fillers are promising thermal conductivity enhancers. One or more carbon materials, including but not limited to graphite, carbon nanotubes, and carbon fiber, particularly vapor grown carbon fiber, may be added to the PCM to increase its thermal conductivity. Therefore, PCM may also contain some carbon materials for improved heat transfer (in addition to the carbon materials in the MFM).

The MFM-PCM composites typically have thermal conductivities that are greater than 10 W/m-K, preferred thermal conductivities are in the range of 30-60 W/m-K, optionally in the range of 50-60 W/m-K; however optionally the thermal conductivity of the MFM-PCM composite can be greater than 60 W/m-K, depending on the MFM composition. Compared to systems which only contain the PCM, a system containing a composite of the same PCM along with a MFM has a thermal conductivity that is at least 10 times greater than the thermal conductivity of the PCM alone, typically the increase in thermal conductivity ranges from about 20-125 times when comparing a composite of a PCM and an MFM to the same PCM alone.

4. Configuration of MFM-PCM Composites in Battery Pack

In some embodiments the composition of the MFM-PCM block is uniform throughout the block.

In other embodiments, the MFM-PCM block is not uniform in its composition. For example, the MFM-PCM block may contain layers of different MFM-PCM composites. Within each layer the MFM are sintered. In some embodiments, the MFM in one layer are sintered with the MFM in another layer. In other embodiments, the MFM in different layers are not sintered together.

Most layers in the block are used for thermal management as described above. However, some of the MFM-PCM layers can contain high melting-point PCMs and/or flame retardant PCMs, e.g. magnesium sulfate heptahydrate (MgSO4.7H2O). These layers can protect the cells during battery catastrophic failure; and thereby provide all-around protection to the cells.

Figure 1B:
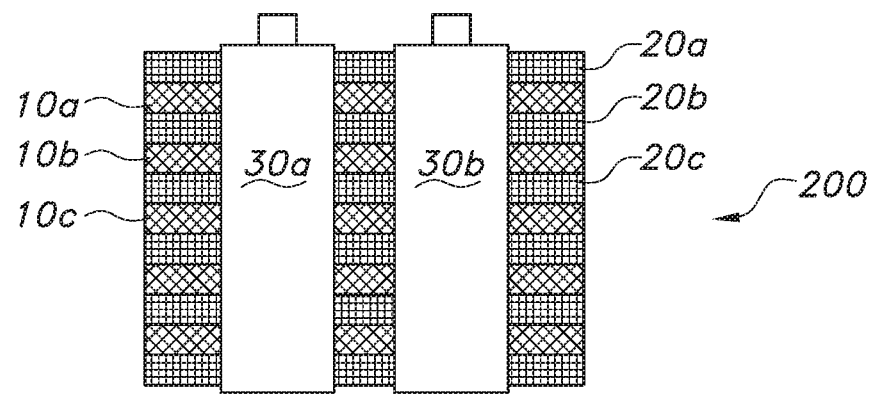
Figure 1C:
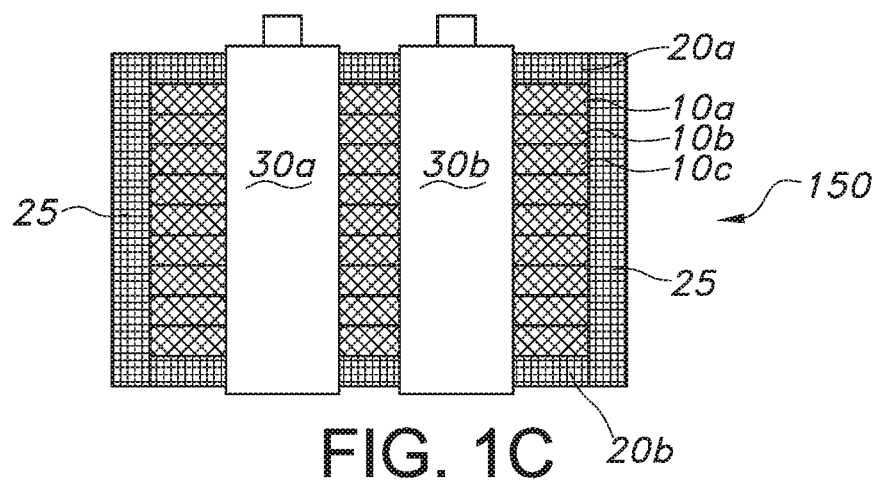

Exemplary battery packs with different functional MFM-PCM composites are depicted in FIGS. 1A, 1B and 1C.

The battery packs may contain one or more MFM-PCM composites. Preferably the battery packs include an MFM-PCM composite where the PCM is a flame retardant material, such as PCM hydrated metal salts like magnesium sulfate heptahydrate ($MgSO_4.7H_2O$), and another MFM-PCM composite where the PCM is a wax or other PCM with a lower melting point than the flame retardant PCM. Optionally, the interior and/or outer layers of the battery pack are surrounded by a flame retardant material.

As illustrated in FIG. 1A, the battery pack 100, may have one or more interior layers 10a, 10b, 10c (collectively 10) containing a first MFM-PCM composite, and at least one and preferably two outer layers 20a and 20b (collectively 20) containing a second MFM-PCM composite. Additionally the battery pack typically contains more than one power cell, such as Li-ion cells. Two cells 30a and 30b (collectively 30) are shown in side view of the battery back depicted in FIG. 1A. However, additional cells, such as at least 3, 4, 5, 6, 7, 8, 9, 10, 11, 12, 13, 14, 15, or more cells may be present in the battery pack.

As illustrated in FIG. 1B, the battery pack 200, may have one or more layers 10a, 10b, 10c (collectively 10) containing a first MFM-PCM composite, and one or more layers 20a, 20b, and 20c (collectively 20) containing a second MFM-PCM composite. Additionally the battery pack typically contains more than one power cell, such as Li-ion cells. Two cells 30a and 30b (collectively 30) are shown in side view of the battery back depicted in FIG. 1B. However, additional cells, such as at least 3, 4, 5, 6, 7, 8, 9, 10, 11, 12, 13, 14, 15, or more cells may be present in the battery pack.

FIG. 1C shows a cross-sectional view of a schematic of an exemplary battery pack containing a flame retardant material as an outer protective covering 25, that surrounds the one or more interior 10 and outer layers 20. Two cells 30a and 30b are shown in side view of the battery back depicted in FIG. 1C. However, additional cells, such as at least 3, 4, 5, 6, 7, 8, 9, 10, 11, 12, 13, 14, 15, or more cells may be present in the battery pack.

Although FIG. 1C shows the battery pack depicted in FIG. 1A, any battery pack could be surrounded by the flame retardant covering 25, such as the battery pack depicted in FIG. 1B and other alternative configurations of interior and outer layers of MFM-PCM optionally with active cooling structures therein. The flame retardant material that is in the covering may be any suitable flame retardant material. Optionally, the flame retardant material is also a PCM, such as PCM hydrated metal salts, e.g. magnesium sulfate heptahydrate ($MgSO_4.7H_2O$).

The MFM in each of the first and second MFM-PCM composites may be the same or different materials.

Generally the PCM in the first MFM-PCM composite is different from the PCM in the second MFM-PCM composite. In particular, generally the PCM in the first MFM-PCM composite has a first melting point and the PCM in the second MFM-PCM composite has a second melting point that is different from the first melting point. In some embodiments, such as depicted in FIGS. 1A and 1C, preferably the melting point of the PCM in the first MFM-PCM composite is lower than the melting point of the PCM in the second MFM-PCM composite. Preferably the second MFM-PCM composite contains a flame retardant PCM material, such as PCM hydrated metal salts, e.g. magnesium sulfate heptahydrate ($MgSO_4.7H_2O$). Preferably the PCM in the first MFM-PCM composite is a wax with a melting point within the range of 40-60° C., preferably 55-59° C., such as Paraffin wax, P116-Wax, or Indrawax 5860-FE.

One of ordinary skill in the art will appreciate that the configuration of the layers of MFM-PCM composites depicted in the battery packs illustrated in FIGS. 1A, 1B and 1C can be modified. For example, the battery pack depicted in FIG. 1A could be modified to include a third, fourth, etc. MFM-PCM composite. Further, a third (or more) layer of the second MFM-PCM composite could be included between two or more of the interior layers. Similarly, the battery pack depicted in FIG. 1B could be modified to include more than one consecutive layer of the first MFM-PCM composite (e.g. two layers 10a and 10b) followed by one or more than one layer of the second MFM-PCM composite (e.g. 20a or 20a and 20b aligned next to each other).

B. Active Cooling Structures

The systems described herein typically also contain one or more active cooling structures that dissipate heat generated from the cell. In some embodiments, the cooling structures are tubes or channels through which cooling fluid flows to dissipate heat generated from the cell. In other embodiments, the structures are cooling plates that dissipate heat generated from the cell. In some embodiments, the systems contain a combination of tubes or channels and plates.

The cooling fluid may be any suitable fluid that can flow through the cooling structures at the desired flow rate and dissipate heat. Suitable cooling fluids include, but are not limited to, water, alcohol-water mixtures, salt-water solutions, and other refrigerants.

The tubes, channels, and/or plates can be made from any material that effectively transfers or dissipates heat. In some embodiments, the tubes, channels, and/or plates can be made from metal, ceramics, and/or glass. Suitable metals include, but are not limited to, copper, nickel, aluminum, steel, stainless steel, silver, gold, alloys thereof, and combinations thereof. Suitable ceramics include, but are not limited to, alumina, aluminum nitride, boron nitride, silicon carbide, enamel, quartz, and combinations thereof.

1. Orientation of Cooling Structures

Figure 2:
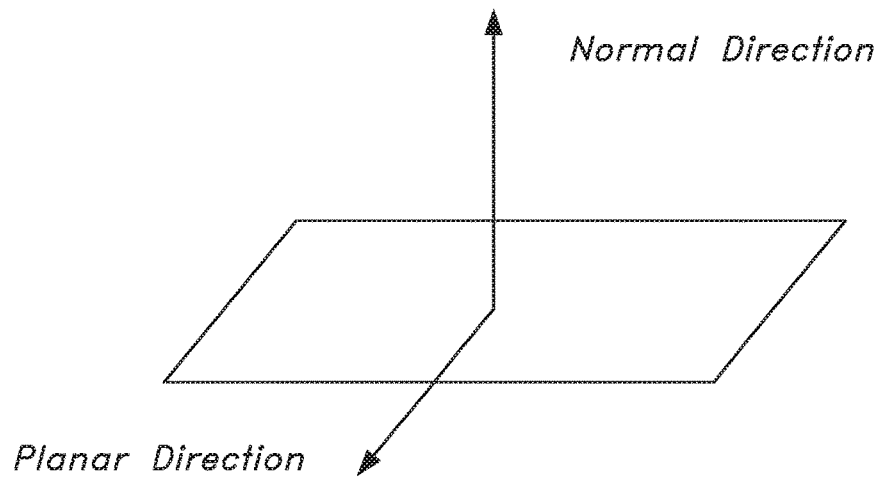
FIG. 2 is a schematic showing the typical orientation of the fibers in the MFM in the planar direction, relative to the direction of the cooling tubes and the cylindrical cells, which are typically oriented in a direction that is perpendicular (normal) to the planar direction.

The MFM-PCM composites are generally not isotropic in their heat transfer properties. The fibers in the MFM are prone to be oriented in the planar direction rather than in the normal direction as shown in FIG. 2. As a result, the heat transfer in the planar direction is generally superior to that in the normal direction.

In preferred embodiments, the cooling tubes and cylindrical cells are parallel to the normal heat transfer direction of the MFM-PCM composites to take the advantage of the fast heat transfer in the planar direction of the MFM-PCM block. In other words, the cooling tubes and the cylindrical cells are parallel to each other.

In order to minimize the heat transfer on the interface between the MFM and active cooling structures (e.g. cooling tubes), preferably the MFM and cooling tubes are sintered together prior to infusing the PCM into the MFM. In these embodiments, the active cooling structures are formed from metal, for example the one or more active cooling structures contain metal tubes and/or metal channels.

2. Flow Rate in Active Cooling Structures

The active cooling structures are preferably kept at a relatively constant temperature to provide a uniform temperature profile inside the entire battery pack. The cooling fluid, e.g. water, is typically fed at a flow rate high enough so that the fluid inlet and outlet temperatures are close, which will not cause a hot end on the cells. Moreover, the cooling fluid passing through the tubes is preferably turbulent, i.e. the Reynolds number (Re, where $$Re = \frac{d\rho u}{\mu}$$

where d is the inner diameter of the tube, ρ is the density of the cooling fluid, u is the velocity of the fluid flowing through the tube, and μ is the dynamic viscosity of the fluid) of the fluids flowing through cooling tubes is typically above 4000, for fast heat transfer inside the cooling structures.

C. Power Cells

The battery packs typically contain one or more, preferably more than one, power cell. Preferably the cells are rechargeable. In a preferred embodiment the cells are Li-ion cells.

The charge and discharge rates of the cells can be described by C-rates. A C-rate is a measure of the rate at which a battery is discharged or charged relative to its maximum capacity. For example, a 10 C rate means that the discharge current will discharge the entire battery in 1/10 hour or 6 minutes.

The cells in the battery packs described herein are generally used for power-intensified applications. They are able to charge and discharge at higher currents so that their capacity can be completely consumed in about 2-4 minutes or 1/30-1/15 of an hour (C rate: 30 C-15 C) and restored in about 6-15 minutes or 1/10-1/4 of an hour (C rate: 10 C-4 C). This requires that 26,650 cells (which typically have diameters of 26 mm and heights larger than 65 mm) with a capacity of 2.5 Ah (Amp-hours) can be discharged at 38-75 Amps or higher and charged at 10-25 Amps and the midform cells, which typically have diameters of 5-6 cm and heights larger than 15 cm, can be discharged at 400-600 Amps and charged at ~100 Amps.

Preferably the cells are arranged in the battery pack to allow for efficient cooling and prevent overheating. In order to maintain high energy density within the battery pack, tight battery packing is also required.

In a preferred embodiment, at least 50% of the pack volume of the battery pack contains power cells, such as Li-ion cells. Preferably, the cells are aligned either in a square or in an equilateral triangle pattern as shown in the cross-sectional views in FIGS. 3A and 3B, where a cell is located in each corner of the square or triangle.

In a preferred embodiment, the cooling tubes are located at the geometric center of each of the squares or the triangles.

Figure 3A:
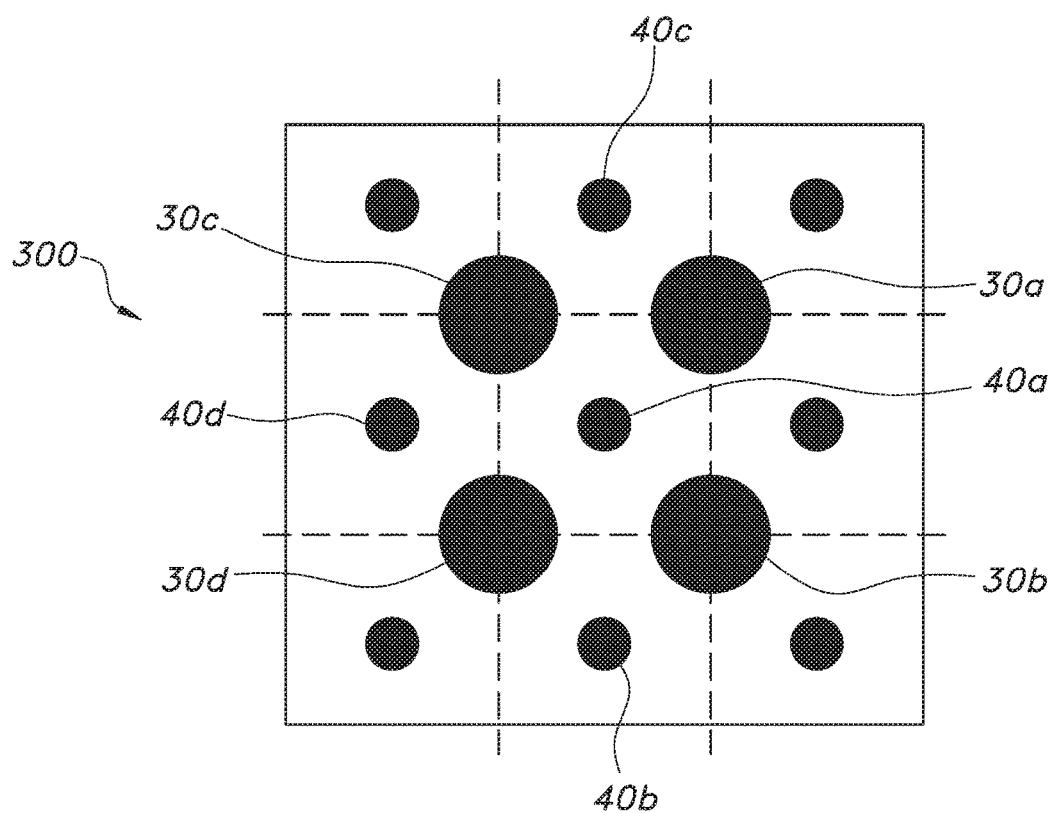

Two exemplary configurations for the cells are depicted in FIGS. 3A and 3B. The MFM-PCM composite block has spaces in a particular pattern, configured to receive the cells and the cooling tubes.

As shown in FIG. 3A, the battery pack 300 may contain a plurality of cells, such as three or more, or five or more cells, where the cells 30a, 30b, 30c, and 30d are aligned with each cell in one of the corners of a square. Additionally, the center of each square contains one or more cooling tubes 40a, 40b, 40c, and 40d (collectively 40).

As shown in FIG. 3B, the battery pack 400 may contain a plurality of cells, such as three or more, or five or more cells, where the cells 30a, 30b, 30c, 30d, and 30e are aligned with each cell in one of the corners of an equilateral triangle. Additionally, the center of each triangle contains one or more cooling tubes 40a, 40b, 40c, and 40d (collectively 40).

Similarly the battery pack 300 may contain an MFM-PCM block with a plurality of holes, such as three or more, or five or more holes, where each hole has a suitable size and shape to receive a cell 30, and where the holes are aligned such that each hole is in one of the corners of a square. Additionally, the center of each square contains one or more smaller holes configured to receive cooling tubes 40a, 40b, 40c, and 40d (collectively 40).

In an alternative configuration, the battery pack 400 may contain an MFM-PCM block with a plurality of holes, such as three or more, or five or more holes, where each hole has a suitable size and shape to receive a cell 30, and where the holes are aligned such that each hole is in one of the corners of an equilateral triangle. Additionally, the center of each triangle contains one or more holes configured to receive cooling tubes 40a, 40b, 40c, and 40d (collectively 40).

Typically the holes are cylindrical holes that run through the length of the MFM-PCM block. Preferably the holes that are configured to receive a cell have a diameter that is slightly larger than the diameter of the cell to allow for insertion of the cell into and removal of the cell from the MFM-PCM block.

1. Insertion and Removal of Cells

After the MFM-PCM block is formed, the Li-ion cells can be inserted into the block in the desired orientations to form a functional battery pack. When the cells need to be replaced, they can be pushed out of the pack. In order to facilitate the cell loading and unloading, the MFM-PCM block for the battery pack may be split into two halves or multiple pieces that are held together by bolts or other similar structures. When the MFM-PCM block is opened, such as by removing the top end plate, the cells can be dropped in or easily removed from the MFM-PCM block.

D. End Plates

The battery pack typically contains two end plates, which hold the entire pack together. The end plates contain designated channels to distribute cooling fluids. The channels are connected with the cooling tubes inside the MFM-PCM block through quick connection parts, such as O-ring seals, face seals, and other press-sealed plates, for leak-free packing. A thermally insulating shell preferably covers the entire battery pack and separates the pack from the surrounding, typically hot, environment.

Optionally, the top and/or bottom end plates include connections to connect the cells inside the battery pack and terminals for energy storage and release.

An exemplary bottom end plate 50 is illustrated in FIG. 4A. An exemplary top end plate 60 is illustrated in FIG. 4B. As shown in FIG. 4B, the top end plate 60 includes at least one coolant supply channel 62 and at least one coolant discharge channel 64.

Additionally, the top and/or bottom end plates typically include one or more venting holes that align with the pressure release holes found on most cells, where the venting holes are open to the environment. The end plates typically include one or more, typically more than one, venting holes to allow for discharge of vapor. Most cells have pressure release holes on the two ends of the cylindrical shapes. In case of abnormal operations, the cells become hot and their electrolytes vaporize. Pressure builds up inside the cells and venting holes open to avoid catastrophic failures, such as explosions. In the battery pack, the endplates typically contain at least one, and generally more than one venting hole and channel to release the vapor. The holes or channels are aligned with the pressure-release holes of the cells, as shown in FIG. 5.

Figure 5:
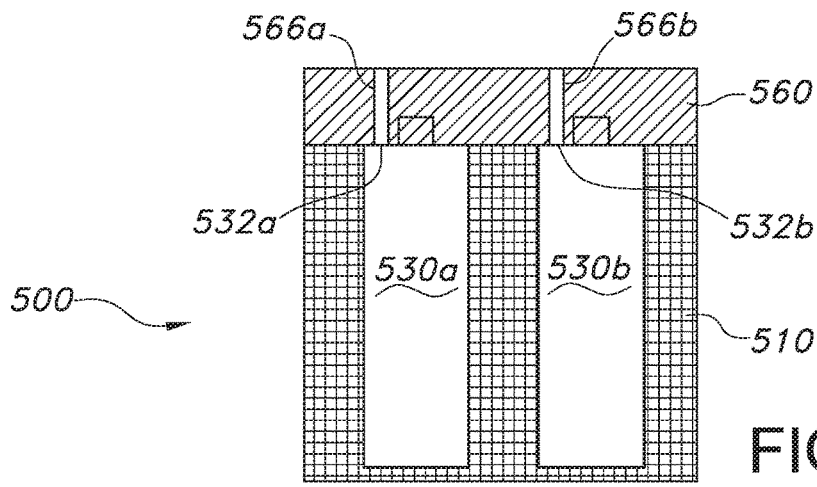
FIG. 5 is a cross-sectional view of an exemplary battery pack with vent holes in the top end plate.

An exemplary a battery pack 500 is depicted in FIG. 5. As shown in FIG. 5, the top end plate 560 contains at least two vent holes or channels 566a and 566b. These vent holes are aligned with the pressure release holes 532a and 532b located on the top of each of the cells 530a and 530b, respectively. The cells are surrounded by an MFM-PCM composite block 510.

Figure 6:
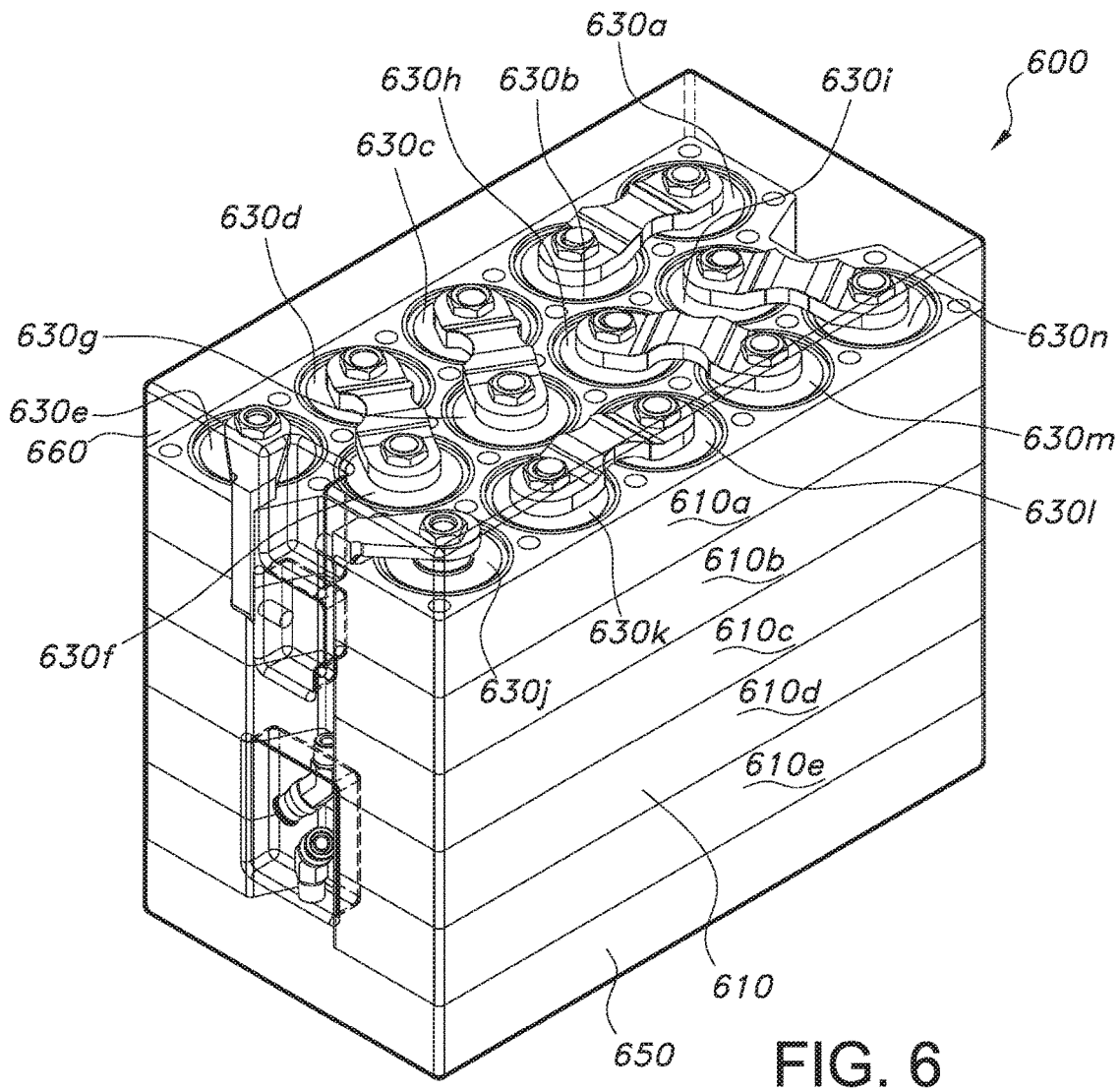
FIG. 6 is an illustration of an exemplary 14-cell pack, illustrated without cooling tubes for ease of viewing.
Figure 7:
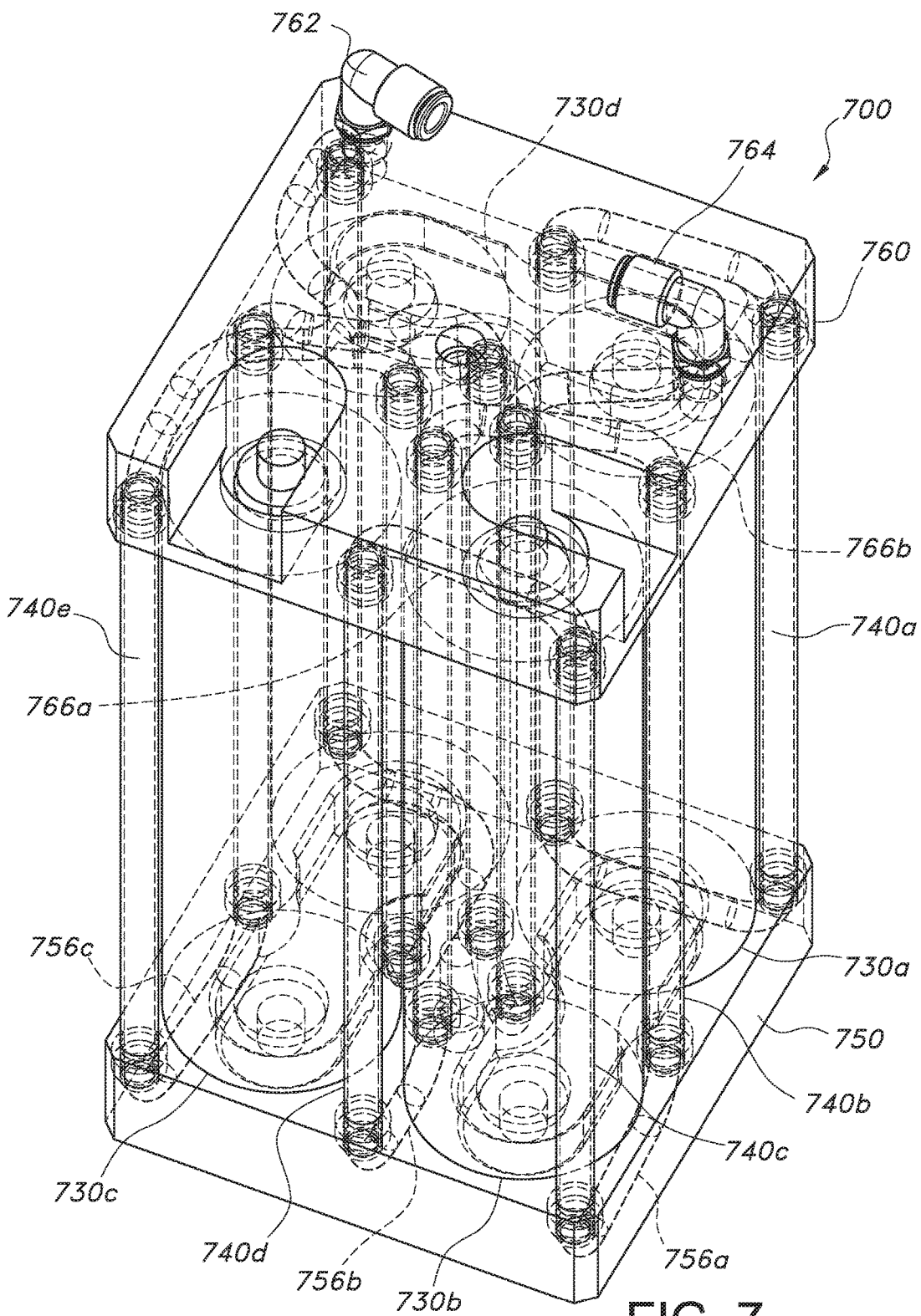
FIG. 7 is an illustration of an exemplary 4-cell pack, illustrated without MFM-PCM for ease of viewing.

Exemplary battery packs are illustrated in FIG. 6 and FIG. 7.

FIG. 6 shows a battery pack 600 with fourteen cells 630a, 630b, 630c, etc. (collectively 630) in an MFM-PCM composite block 610. The MFM-PCM composite block may contain multiple layers, optionally one or more of the layers of MFM-PCM is different from the other layers. For example at least one layer in the MFM-PCM block 610 may contain a different PCM than one or more of the other layers in the block. As shown in FIG. 6, the block contains five layers (610a, 610b, 610c, 610d, and 610e). However, the skilled person will recognize that different numbers of layers may be present in the MFM-PCM block. Optionally, the layers alternate, such as depicted in FIG. 1B, where one layer contains a first PCM and the adjacent layer contains a second PCM, and the next layer contains the same PCM as the first layer, followed by a layer that contains the same PCM as the second layer. Optionally, the top and bottom layers contain flame retardant PCM, such as depicted in FIG. 1A. FIG. 6 does not show the cooling tubes to facilitate viewing of the other components in the battery pack. The top end plate 660 covers the sides and the top of the cells and MFM-PCM block, while the bottom end plate 650 is affixed to the bottom of the cells (not shown in figure) and the bottom of the MFM-PCM composite block 610 (or bottom layer thereof, e.g. 610e).

FIG. 7 shows a battery pack 700 with four cells 730a, 730b, 730c, and 740d (collectively 730) in an MFM-PCM composite block, such as the block 610 depicted in FIG. 6. FIG. 7 does not show the MFM-PCM composite(s) to facilitate viewing of the other components in the battery pack. The top end plate 760 covers the top of the cells, while the bottom end plate 650 is affixed to the bottom of the batteries. Cooling tubes 740a, 740b, 740c, and 740d (collectively 740) are interspersed between adjacent cells at regular intervals and have a top portion and a bottom portion, which connect with the channels in the top end plate 760 and in the bottom end plate 750, respectively. Additional cooling tubes are located in the center of the battery pack at regularly spaced intervals from each other. While four central cooling tubes are depicted in FIG. 7, the skilled person will recognize that alternative numbers of cooling tubes may be used. As shown in FIG. 7, the top end plate 760 also contains a coolant supply inlet 762 and a coolant discharge 764, which connect to the channels and thus to the cooling tubes. The bottom end plate 750 includes channels 756a, 756b, etc (collectively 756) which connect a first cooling tube (e.g., 740c) to a second cooling tube (e.g., 740d), allowing the cooling fluid to flow through all of the cooling tubes in the battery pack. The top end plate contains similar channels 766a, 766b (collectively 766), which connect a first cooling tube (e.g., 740d) to a second cooling tube (e.g., 740c), allowing the cooling fluid to flow through all of the cooling tubes in the battery pack.

The skilled person will understand that the top and bottom end plates can be used in any of the battery packs described herein. For example, alternative configurations for the MFM-PCM and layers thereof, such as illustrated in FIGS. 1A-1C may be used with a top end plate, e.g. 560, 660 or 760 and/or with a bottom end plate, e.g. 750.

EXAMPLE

The battery cooling performance of a battery pack with MFM-PCM and cooling tubes, where the MFM was sintered to the cooling tubes, was calculated using experimental performance and COMSOL simulation results for a number of different battery packs. A representative example is described below.

The overall heat transfer rate was calculated using the experimental performance and COMSOL simulation results. For a MFM-PCM battery pack with cooling tubes sintered to the MFM and twelve midform (i.e., 223 mm long and diameter of 54 mm) cells in series (12 S), the overall heat transfer rate was determined to be 600 W/m$^2$ K. The MFM-PCM block was pressed and sintered and contained 30% metal fiber (copper fibers, 12 micron diameter) and 70% PCM (paraffin wax).

The overall heat transfer rate was determined using an overall energy balance. The 12 S pack was placed in a 58°

Figure 8:
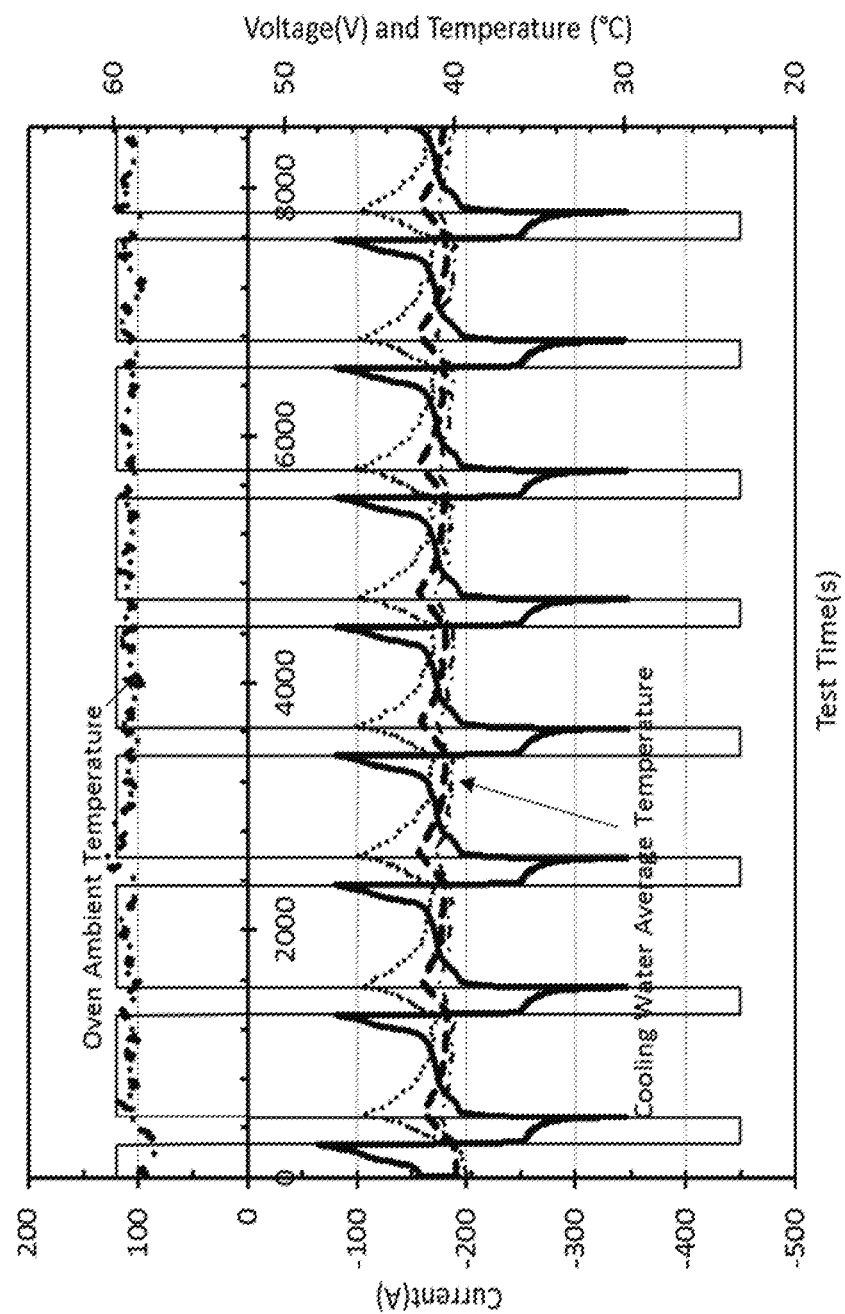
FIG. 8 is a graph of Current (A), Voltage (V) and temperature (° C.) over time (seconds) showing the experimental performance of a 12 S 30% MFM-70% PCM battery pack with sintered cooling tubes battery pack during 4 C (120 A) charge/15 C (450 A) discharge cycles. Thin Solid line=12 S pack current (A), thick solid line=12 S pack voltage (V), dotted line=cell surface temperature (° C.), thick dashed line=block surface temperature (° C.), line alternating dashes and dots=cooling water average temperature (average of inlet and outlet temperatures) (° C.), and oven ambient temperature (° C.).

C. oven and continuously charged and discharged at C-rates of 4 C (120 Amp) and 15 C (450 Amp), respectively. The surface area of the batteries, the cell surface temperature, the cooling water temperature, ambient temperature, and heat generation were determined experimentally during the charge and discharge cycling test (see FIG. 8) and used to complete the energy balance.

The calculated heat transfer coefficient was used in a COMSOL simulation of the 12 S pack at the same test conditions, and the simulation results were compared to the experimental results to confirm the accuracy of the heat transfer rate calculation. The thermal conductivity for pressed and sintered MFM-PCM with 30% metal fiber and 70% PCM is 55-60 W/mK.

The maximum stable cell surface temperature was about 46° C. The melting point of the PCM (paraffin wax) was 55° C.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entirety. The present invention may be embodied in other specific forms without departing from the spirit or essential attributes thereof.

We claim:

1. A battery pack comprising a microfibrous media (MFM)-phase change materials (PCM) composite block, one or more cells, and one or more cooling tubes, channels or a combination thereof,
   wherein the MFM is sintered to the cooling tubes and/or channels, and
   wherein the cells are aligned parallel with the cooling tubes and/or channels, and
   wherein the cells are aligned generally perpendicular to the planar direction of the MFM.

2. The battery pack of claim 1, wherein the MFM-PCM composite block comprises a plurality of cylindrical holes and wherein the cells are in the holes.

3. The battery pack of claim 1, comprising more than one MFM-PCM composite block, wherein each block contains the same or different materials.

4. The battery pack of claim 3, wherein one or more of the MFM-PCM composite blocks contains multiple layers, and wherein at least one of the layers contains a different phase change material than the other layers.

5. The battery pack of claim 4, wherein at least one layer contains a flame retardant PCM, and wherein the other layers contain a PCM with a lower melting point than the flame retardant PCM.

6. The battery pack of claim 5, wherein the flame retardant PCM is a metal salt-based PCM.

7. The battery pack of claim 6, wherein the flame retardant PCM is magnesium sulfate heptahydrate ($MgSO_4.7H_2O$).

8. The battery pack of claim 1, wherein the PCM in at least one of the MFM-PCM composite block is selected from the group consisting of paraffin waxes, glycols, and fatty acids.

9. The battery pack of claim 1, wherein the MFM in the MFM-PCM composite block has a thermal conductivity of at least 5 W/(m·K).

10. The battery pack of claim 9, wherein the MFM has a volume fraction of at least 5%.

11. The battery pack of claim 1, wherein the PCM comprises one or more carbon materials selected from the group consisting of graphite, carbon nanotubes, and carbon fibers.

12. The battery pack of claim 2, wherein the holes are aligned in a repeating square or and equilateral triangle pattern.

13. The battery pack of claim 12, wherein at least one of the cooling tubes or channels is located in the geometric center of each pattern.

14. The battery pack of claim 1, comprising one or more cooling tubes, wherein the MFM is sintered to the one or more cooling tubes.

15. The battery pack of claim 1, further comprising an upper end plate, a lower end plate or both.

16. The battery pack of claim 15, wherein the end plates comprise channels that connect to one end of each of the cooling tubes or channels.

17. The battery pack of claim 15, wherein the end plates comprise one or more venting holes that are open at one end and in contact with the cells at the opposite end.

18. The battery pack of claim 2, wherein the cooling tubes comprise a cooling fluid selected from the group consisting of water, alcohol-water mixtures, salt-water solutions, and other refrigerants.

19. The battery pack of claim 5, wherein the layer containing the flame retardant PCM is an outerlayer.

20. The battery pack of claim 1, wherein the MFM comprises a metal.

* * * * *